United States Patent Office 3,550,190
Patented Dec. 29, 1970

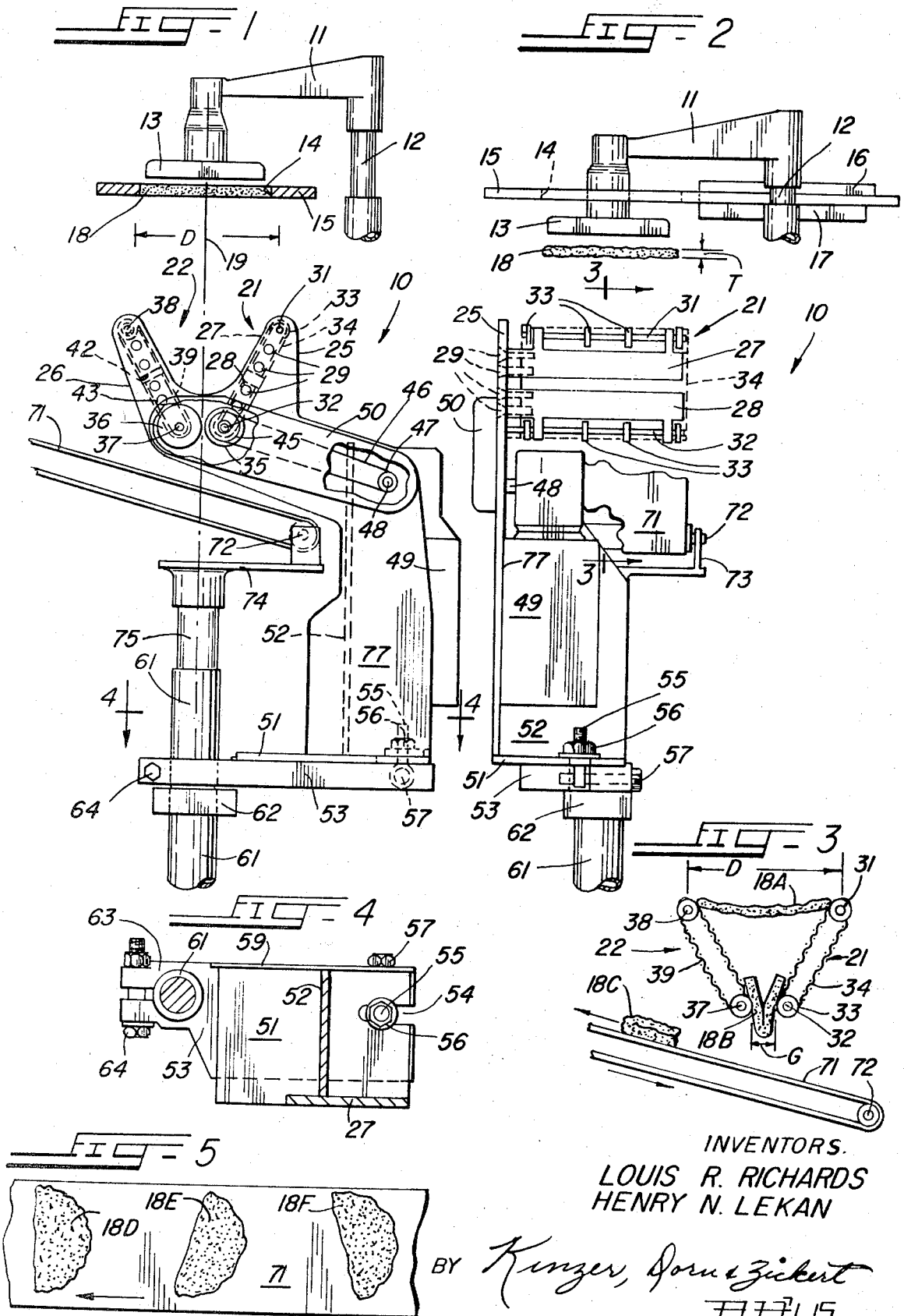

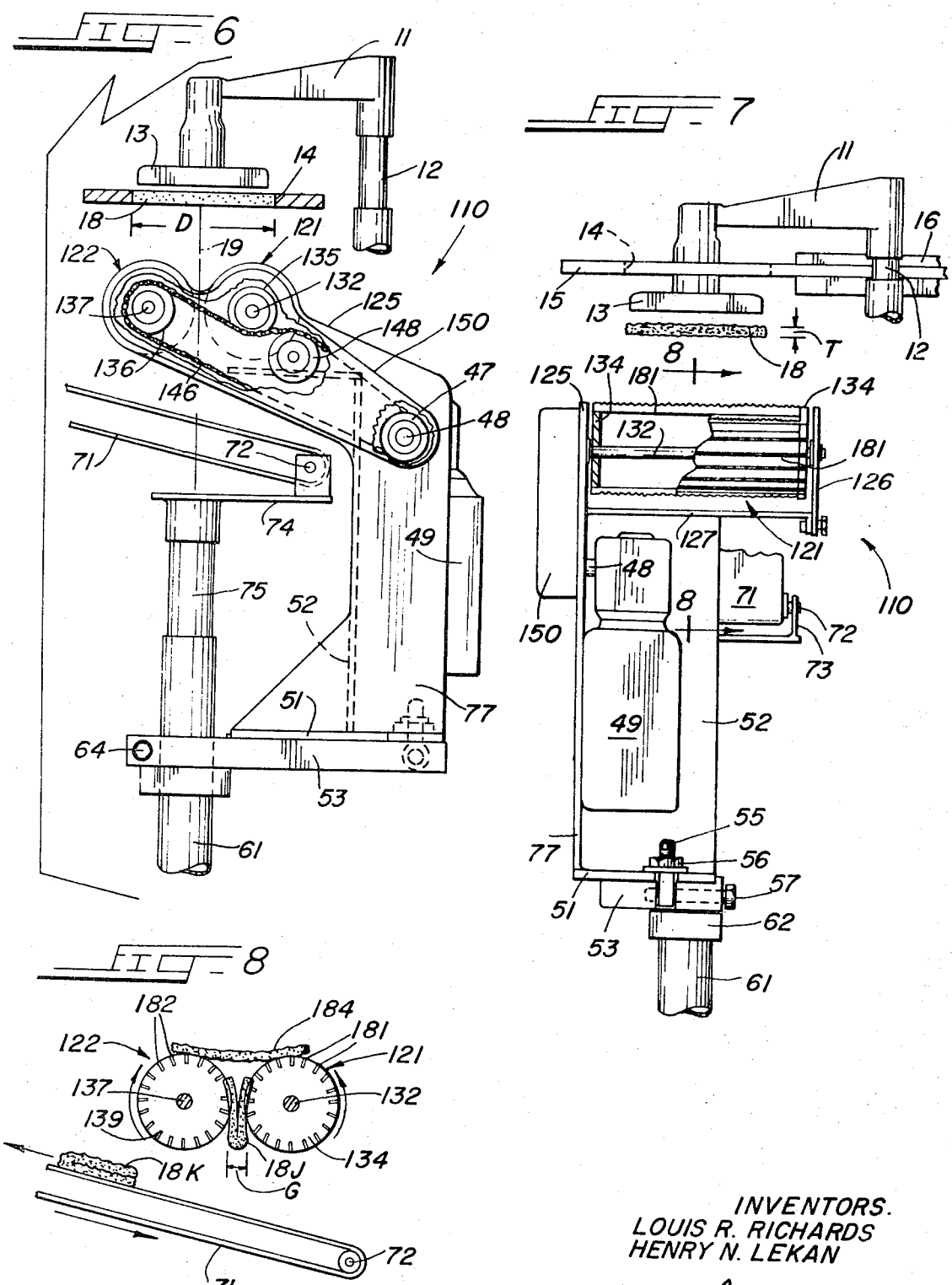

3,550,190
STEAK FOLDER
Louis R. Richards, Mokena, and Henry N. Lekan, Chicago, Ill., assignors to Richards/Lekan Engineering, Mokena, Ill., a partnership
Filed Feb. 19, 1969, Ser. No. 800,668
Int. Cl. A22c 7/00; A47j 43/20
U.S. Cl. 17—32                                                    9 Claims

ABSTRACT OF THE DISCLOSURE

A steak folder comprising two continously driven open-mesh conveyor members arranged in a converging V configuration; the steak is deposited flat on the top of the V and is discharged, folded, from the bight of the V.

BACKGROUND OF THE INVENTION

Hamburger steaks and other forms of steak and food patties are often formed and processed by automatic machines and subsequently packaged and distributed to restaurants, food stores, and other outlets. Frequently, it is desirable to fold the steak or other food patty prior to packaging. Folding devices as utilized in other fields are not particularly satisfactory for this purpose and manual folding of the steaks is unduly expensive. In particular, manual folding may be quite time-consuming in assuring that the folding operation is uniform and may lead to contamination of the food. Folding devices generally applicable to thin sheets of material are not particularly satisfactory or effective with respect to the rather soft, plastic masses of substantial thickness presented by hamburger steaks and similar molded or cut food products.

One application in which folding of "manufactured" steaks is highly desirable entails passing the steaks through a series of scoring rollers, in which the steaks are drawn out, flattened, and textured. Folded steaks thus processed lose their machine-made symmetry and afford an appearance more like cut steaks than manufactured steaks. Other expedients directed toward the same end (e.g., irregular forming dies) do not give the same attractive results as scoring of prefolded patties.

Throughout this specification, and in the appended claims, the term "steak" is used to refer to molded hamburger steaks, molded chicken patties, and any other form of molded or cut food product of a relatively large and generally flat configuration having a substantial thickness, including thick slices of meat in the generally natural state as well as steaks molded of ground or otherwise particulate material.

SUMMARY OF THE INVENTION

It is a principal object of the invention, therefore, to provide a new and improved steak folder that is simple, efficient, and accurate in operation and that requires no timing mechanism to control its operation.

A specific object of the invention is to provide a new and improved steak folder that assures uniform balanced folding of steaks despite substantial variations in overall size and thickness and regardless of variations in shape of the steaks.

Another object of the invention is to provide a new and improved steak folder that can be adjusted to orient the fold line of the steak at virtually any desired angle on a transfer conveyor that receives the steaks after they have been folded.

Accordingly, the invention relates to a steak folder for receiving and folding individual steaks that are discharged in a flat alignment, one-by-one, for free-falling movement along a given path. The steak folder comprises two conveyor members disposed on opposite sides of the path in inclined downwardly converging spaced relation to each other. The convergent portions of the two conveyors are spaced from each other by a folding gap that is not substantially wider than twice the thickness of a steak, whereas the upper ends of the conveyors are spaced by a distance of the order of the steak length. The steak folder includes drive means for driving the two conveyors at related speeds, in a converging direction, so that each steak is driven through the aforesaid gap and is folded upon itself as it passes through the gap. Transfer means may be provided for receiving the folded steaks as they are discharged through the folding gap.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a front elevation view of a steak folder constructed in accordance with one embodiment of the invention, shown in alignment with a part of a conventional hamburger steak molding machine;

FIG. 2 is a side elevation view of the apparatus of FIG. 1;

FIG. 3 is a detail sectional elevation view taken approximately as indicated by line 3—3 in FIG. 2;

FIG. 4 is a detail sectional view taken approximately as indicated by line 4—4 in FIG. 1;

FIG. 5 is a plan view illustrating various steak positions on the transfer conveyor; and FIGS. 6, 7 and 8 are views, like FIGS. 1, 2 and 3 respectively, of another embodiment of the invention.

DESCRIPTION OF THE PREFERRED EMBODIMENT

The steak folder 10 illustrated in FIGS. 1–3, and constituting one embodiment of the present invention, is shown in conjunction with the discharge station of a hamburger steak molding machine generally similar to that described and illustrated in Holly Pat. No. 3,293,688, issued Dec. 27, 1966. The portion of the hamburger steak molding machine shown in FIGS. 1 and 2 comprises a knock-out arm 11 mounted as a cantilever member upon a vertically slidable rod 12. Knock-out arm 11 carries a knock-out cup 13 that is aligned with the central opening 14 in a mold plate 15. Mold plate 15 is supported between a top plate 16 and a bottom plate 17, as shown in FIG. 2.

In operation of the hamburger steak molding apparatus, of which only a portion is shown in FIGS. 1 and 2, the hamburger steak 18 is molded within the mold plate opening 14, by apparatus that is not shown in the drawings, and is brought into alignment with knock-out cup 13 when the steak molding operation is completed (FIG. 1). To discharge steak 18 from the molding apparatus, knock-out arm 11 moves downwardly from the position shown in FIG. 1 to that illustrated in FIG. 2. This movement of the knock-out arm drives knock-out cup 13 through the mold plate opening and discharges steak 18 to fall freely along the vertical path generally illustrated by centerline 19. The free-falling movement of steak 18 is shown in FIG. 2.

Steak folder 10 comprises two conveyors 21 and 22 that are located on opposite sides of path 19. Conveyors 21 and 22 are disposed in inclined downwardly converging spaced relation to each other, as best shown in FIGS. 1 and 3. The lower ends of the two conveyors are spaced from each other by a folding gap G that is not substantially greater than twice the thickness T of the steak 18. Preferably, gap G is slightly smaller than twice thickness T. The upper ends of conveyors 21 and 22, on the other hand, are spaced from each other by a distance D that is of the order of the length L of one of the steaks to be folded. Distance D can be smaller or larger than length L by at least an inch or so either way; however, too much difference from the steak length can lead to erratic and uneven folding.

Conveyors 21 and 22 are cantilever mounted upon two frame projections 25 and 26 that constitute a part of a side frame 77. Conveyor 21 comprises an upper mounting bracket 27 and a lower mounting bracket 28, each affixed to frame projection 25 by appropriate means such as a series of bolts 29. Bracket 27 affords a mount for an upper shaft 31 and bracket 28 supports a lower shaft 32. Each of the shafts 31 and 32 carries a plurality of sprockets 33 around which an open mesh wire belt 34 extends. The cantilever construction of the conveyors contributes considerably to the ease of thorough cleaning of the steak folder.

The lower conveyor shaft 32 of conveyor 21 extends through frame projection 25 and a gear 35 is mounted on this shaft on the opposite side of frame projection 25 from the remainder of conveyor 21. Gear 35 is positioned in meshing engagement with a similar gear 36 that is mounted upon the lower shaft 37 of the other conveyor 22. Conveyor 22 is generally similar in construction to conveyor 21 and includes, in addition to shaft 37, an upper shaft 38 and an open wire mesh conveyor belt 39, belt 39 being mounted upon a plurality of sprockets 41 supported upon the two shafts 37 and 38. As in conveyor 21, the operating parts of conveyor 22 are supported upon a pair of mounting brackets 42 and 43 that are affixed to the frame projection 26.

The lower shaft 32 for conveyor 21 also carries a chain sprocket 45. A drive chain 46 extends around sprocket 45 and around a drive sprocket 47 that is mounted upon the output shaft 48 of a gear motor 49. Gear motor 49 is mounted, by appropriate means, on the side frame 77. A cover 50 is provided for chain 46, sprockets 45 and 47, and gears 35 and 36.

Side frame 77 is affixed to a bottom frame member 51 (FIGS. 1, 2 and 4). The side frame may be provided with an appropriate stiffening member or gusset 52 welded or otherwise secured to both the side frame and the bottom frame member Bottom frame member 51 is supported upon a mounting plate 53. The mounting arrangement comprises an elongated slot 54 in bottom frame member 51, through which a bolt 55 extends. At its upper end, bolt 55 carries a clamping nut 56 that clamps bottom frame member 51 against mounting plate 53. The lower end of bolt 55 is secured to a mounting pin 57 that is mounted in plate 53. A guide rail 59 maintains bottom frame member 51 in alignment on mounting plate 53.

Mounting plate 53 is pivotally mounted upon a mounting post 61 by means of a support collar 62, a yoke 63, and a clamp bolt 64. The position of mounting plate 53 can be adjusted, relative to mounting post 61, by loosening bolt 64 to release the clamping engagement of yoke 63 on post 61. With the yoke loosened, the mounting plate 53 is supported by collar 15 and can be rotated about post 61 until a desired angular orientation is achieved. Bolt 64 is then tightened to clamp yoke 63 about the mounting post and maintain mounting plate 53 in the desired orientation.

Mounting post 61 also serves as a basic support for one end of a transfer conveyor belt 71. The belt conveyor 71 engages a pulley 72 supported between two mounting brackets 73 mounted upon a support plate 74 that is in turn supported on a vertically adjustable post 75 that fits into mounting post 61. A set screw or other appropriate retainer (not shown) may be provided to maintain post 75 at a given adjusted height relative to mounting post 61 and hence at a predetermined height in relation to the two conveyors 21 and 22 of the steak folder.

In considering the operation of steak folder 10, it should be understood that gear motor 49 operates continuously and drives both of the conveyor belts 34 and 39, at equal or generally similar speeds, in the directions indicated by the arrows in FIG. 3. The continuous drive is effected through chain 46, which rotates the lower conveyor shaft 32 of conveyor 21. Rotation is imparted to shaft 37 of conveyor 32 through the drive connection afforded by gears 35 and 36.

The individual steaks to be folded by steak folder 10 are discharged flat, one-by-one, for free-falling movement along path 19, as shown in FIGS. 1 and 2. As each steak falls downwardly, it reaches the position of the steak 18A in FIG. 3, with the edges of the steak engaging the open mesh belts 34 and 39 of conveyors 21 and 22. The downward converging movement of the two conveyor belts urges the steak toward the discharge gap G at the bottom of the conveyors. Thus, each steak is folded when it leaves the two conveoyrs, as indicated by steak 18B in FIG. 3. Each folded steak is received by the transfer belt 71, as it is discharged through gap G, and is carried away for further processing, as indicated by the folded steak 18C in FIG. 4.

To assure even folding, it is desirable that the conveyors 21 and 22 be accurately aligned with respect to the centerline of the path 19 of the falling steaks. This can be accomplished by adjustment of the position of frame 77 on mounting plate 53, utilizing the slot bolt 55. If an uneven fold is desired, the slot adjustment for the frame of the steak folder can also be utilized to displace the fold from the center of the steak to a limited extent.

The single latching device for the steak folder frame, comprising slot bolt 55 and its mounting, also makes it possible to remove the steak folder quickly and conveniently from its operative position below the knock-out cup 13 of the steak forming machine. This is important for effective cleaning, or when it is desired to process steaks without folding them. Thus, the nut 56 on slot bolt 55 can be released and the nut and bolt assembly can then be swung down out of the way to free the top of mounting plate 53 for convenient and rapid removal or remounting of the steak folder in its working position.

If the steak folder is aligned, as shown in the drawings, so that conveyors 21 and 22 extend transversely of transfer belt 71 along lines approximately normal to the length of the belt, the folded steaks are deposited on the belt with the fold line normal to the length of the belt as shown by the steak 18D in FIG. 5. For subsequent processing purposes, it may be desirable to have the steaks deposited upon the transfer conveyor at some other angle. This can be accomplished by adjusting the angular position of the steak folder, using yoke 63 and clamp bolt 64 as described above. Thus, angular displacement of the steak folder relative to the transfer belt makes it possible to deposit the steaks with different angular orientations on the belt as illustrated by steaks 18E and 18F in FIG. 5.

It is possible to provide for adjustment of the discharge gap G for the steak folder conveyors 21 and 22. However, adjustment of this gap is not normally necessary, particularly when open mesh conveyors are used; the steak folder can fold steaks of rather substantially different thicknesses with no change in the folding gap. As long as open mesh conveyors are used, permitting some penetration of the relatively plastic material of the steak into each of the conveyors, a thickness ratio of up to 2:1 can be tolerated. As a specific example, using wire mesh conveyors, it has been found that a gap G of 3/8 inch permits effective folding of steaks ranging in thickness from 3/16 to 5/8 inch without damage to the steaks. When the folded thickness of the steak is greater than the gap G, the steak is bulged out into the openings in the mesh of the conveyor belts, and passes through the gap without damage. Wire belts or other forms of open mesh belt are highly useful in providing this adaptability to steaks of varying thickness.

In some applications it may not be possible to center the steak folder exactly along the path followed by the falling steak. This is particularly true where the steak folder is incorporated in a steak molding machine. For example, in some commercial machines, there is a tendency for the steak to be impelled toward the right of centerline 19 (FIG. 1), and there may be insufficient space to position the steak folder for accurately centered reception of the steaks on the conveyors 34 and 39.

This condition can be corrected, within limits, by changing the relative speeds of the conveyors. Thus, if the steaks fall off-center to the right (FIGS. 1, 3) the gear ratio of gears 35 and 36 can be selected to afford a somewhat higher speed for conveyor 34 than conveyor 39. This gear relationship is illustrated in FIG. 1, gear 36 being shown somewhat larger than gear 35 and hence rotating at a lower angular speed. By thus modifying the gear ratio, the steak fold can be centered even when space limitations prevent adequate lateral adjustment of the steak folder position.

Steak folder 10, despite its simplicity of construction, is efficient and accurate in operation. Moreover, it requires no timing mechanism to control its operation; that is, it need not be coordinated to the operation of the steak molding machine, as long as conveyor members 21 and 22 are operated at speeds sufficient to accept and dispose of the steaks as rapidly as they are deposited in the steak folder. The steak folder need not be fed directly from the processing machine but can be used independently, so long as there is some means for discharging the steaks one-by-one for generally flat free-falling movement into the two conveyors of the steak folder. Uniform and balanced folding of the steaks is achieved despite variations in overall size, thickness and shape of the steaks. On the other hand, some imbalance can be deliberately introduced by adjustment of the steak folder in relation to the apparatus that discharges steaks into the folder. Within limits, the steak folder can be readily adjusted to orient the fold line of the steaks at virtually any desired angle on the transfer conveyor that removes the steaks from the folder.

FIGS. 6, 7 and 8 illustrate a steak folder 110 comprising another embodiment of the invention. Steak folder 110 is shown in association with a part of a steak molding machine comprising a knock-out arm 11 mounted upon a vertically slidable rod 12 and having a knock-out cup 13 aligned with the central openings 14 in a horizontally reciprocating mold plate 15. As before, discharge of steaks is accomplished by movement of knock-out cup 13 in a downward direction from the position shown in FIG. 6 to that shown in FIG. 7, discharging a molded steak 18 downwardly along path 19 into the steak folder.

The frame and mount for steak folder 110 are generally similar to the construction described above in connection with steak folder 10. A frame member 51 is supported upon a mounting plate 53, the mounting arrangement comprising an elongated slot 54, a retaining bolt 55, and a clamp nut 56. As before, mounting plate 53 is pivotally mounted upon a post 61 by a mounting arrangement comprising a support collar 62, a yoke 63, and a clamp bolt 64. Mounting post 61 also supports one end of a transfer conveyor belt 71, a pulley 72 for the belt being mounted upon a bracket 73 on a support plate 74 affixed to a post 75 that fits into post 61.

The fold-making elements of steak folder 110, however, are different in construction from those employed in steak folder 10. Thus, steak folder 110 comprises two conveyor members 121 and 122 of cylindrical drum-like construction. Conveyor member 121 comprises a central shaft 132 that is journaled at one end in a suitable bearing mounted in a frame projection 125 that is a part of the main frame member 77. The opposite end of shaft 132 is supported in a bearing mounted in an auxiliary frame member 126. Frame member 126 is supported upon a horizontally extending frame plate 127 that is welded or otherwise fixedly mounted to frame member 77 (FIG. 7). Conveyor member 121 further comprises two slotted discs 134 that are affixed to shaft 132 for rotation therewith. A plurality of peripherally spaced serrated blades 181 are mounted in and extend between the two end discs 134 and the rotary conveyor 121.

The second rotary conveyor member 122 is generally similar in construction to member 121. It comprises a shaft 137 (FIG. 8) upon which two end discs 139 are fixedly mounted. A plurality of serrated blades 182 extend between and are mounted in the slotted end discs 139, affording a second drum-like conveyor member having an open mesh surface. Additional support discs can be used for blades 181 and 182, if desired.

The shaft 132 of conveyor member 121 extends through frame projecton 125, as shown in FIG. 6, and carries a sprocket 135. Similarly, the shaft 137 of conveyor member 122 has a sprocket 136 mounted thereon. The two sprockets 135 and 136 are engaged by a drive chain or belt 146 that extends around an idler sprocket 148 and that engages the sprocket 47 on the output shaft 48 of the gear motor 49. As before, gear motor 49 is mounted upon side frame 77. An appropriate cover 150 is provided for drive chain 146 and sprockets 135, 136, 148 and 47.

The drive arrangement is such that rotary conveyor members 121 and 122 are driven in opposite directions, as indicated by the arrows in FIG. 8. Furthermore, a steak falling into the steak folder 110, as illustrated by steak 18 in FIG. 7 and steak 18H in FIG. 8, engages the rotary conveyor members in a manner such that the conveyor members are moving in a convergent downward direction toward a minimum gap, between the conveyor members, at which the two conveyor members are separated by a distance G. The steak is folded and passes through the gap G, as indicated by steak 18J in FIG. 8, and falls onto transport conveyor 71 for removal from beneath the folding conveyors. A folded steak 18K is shown being transported from the steak folder (FIG. 8).

In steak folder 110, as in folder 10, the center-to-center spacing of the two conveyor members 121 and 122, which determines the spacing between the points at which each falling steak contacts the conveyor members, should not greatly exceed the maximum dimension D of the individual steaks. By the same token, the center-to-center spacing of the rotary conveyor members is preferably not substantially smaller than the steak dimension D. Moreover, and as in the first-described embodiment, the gap G should not be substantially larger than twice the thickness T of the individual steaks and preferably is slightly smaller than the doubled steak thickness. In the steak folder 110, a substantial range of steak thicknesses can be accommodated, up to a ratio of about 2:1, just as in the case of steak folder 10. The openings between the serrated blades 181 and 182 on the open-mesh rotary conveyor members 121 and 122 accommodate substantial bulging of the steaks without material damage to the steaks.

Steak folder 110 can be adjusted in its angular orientation to change the alignment of the folded steaks on conveyor 71 in the same manner as described above for steak folder 10. Furthermore, the relative speeds of rotary conveyor members 121 and 122 in folder 110 can be varied to accommodate slight misalignments of the steak folder with respect to the discharge centerline 19 and to provide effective adjustment of the fold line on the steaks, just as in folder 10.

We claim:

1. A steak folder for receiving and folding individual steaks discharged flat, one-by-one, for free-falling movement along a given path terminating at a transfer means for receiving the steaks, said steak folder comprising:

two conveyors, disposed on opposite sides of said path in inclined downwardly converging spaced relation to each other, as viewed from above, the convergent points on said conveyors being spaced from each other by a folding gap not substantially greater than twice the thickness of a steak and the upper ends of the conveyors being spaced by a distance of the order of the length of a steak; and drive means for continuously driving said two conveyors at related speeds in a converging direction to drive each steak downwardly through said gap and thereby fold the steak, depositing each steak in folded condition on said transfer means.

2. A steak folder according to claim 1 in which each of said conveyors is of open mesh construction to permit at least some penetration of the conveyors by each steak in passing through said folding gap.

3. A steak folder according to claim 2 in which each of said conveyors comprises an open mesh wire belt to permit maximum penetration of the mesh by the steak when the steak thickness exceeds one-half the folding gap between the conveyors.

4. A steak folder according to claim 2 in which each of said conveyors comprises a rotary drum-like member having an open-mesh surface.

5. A steak folder according to claim 4 in which each of said drum-like members includes a plurality of peripherally spaced blades supported in equal radially spaced relation to a central shaft.

6. A steak folder according to claim 2, and further comprising:

a unitary frame supporting said two conveyors; and mounting means for said frame, including means for adjusting the angular orientation of the fold lines of the folded steaks as deposited on said transfer means.

7. A steak folder according to claim 6, in which said frame mounting means includes means for adjusting the position of said frame, toward and away from said path, through a limited distance to vary the fold alignment of the steaks.

8. A steak folder according to claim 1, in which both of said conveyors are mounted on a single-side frame, and in which said frame is provided with a single releasable latching device for rapid mounting and demounting of the steak folder relative to the discharge path of said steaks.

9. A steak folder according to claim 1, in which the receiving point of one of said conveyors is closer to said path than the receiving point of the other conveyor, and in which said one conveyor is driven at a somewhat higher speed than said other conveyor to afford a centered fold in each steak.

References Cited
UNITED STATES PATENTS

| | | | |
|---|---|---|---|
| 1,236,998 | 8/1917 | Tommasini | 107—1.1 |
| 2,070,850 | 2/1937 | Trabold | 17—32WX |
| 2,509,971 | 5/1950 | Elsaesser | 17—32 |
| 2,545,451 | 3/1951 | Elsaesser | 17—32 |

LUCIE H. LAUDENSLAGER, Primary Examiner

U.S. Cl. X.R.

107—1